United States Patent [19]

Miyoshi

[11] Patent Number: 4,589,650
[45] Date of Patent: May 20, 1986

[54] PAPER FEEDING DEVICE

[75] Inventor: Yoshitake Miyoshi, Ikoma, Japan

[73] Assignee: Mita Industrial Co., Ltd., Osaka, Japan

[21] Appl. No.: 645,096

[22] Filed: Aug. 28, 1984

[30] Foreign Application Priority Data

Sep. 28, 1983 [JP] Japan .................................. 58-181618

[51] Int. Cl.[4] .......................... B65H 9/00; B65H 3/06
[52] U.S. Cl. .................................... 271/242; 271/122; 271/188; 271/266
[58] Field of Search ............... 271/242, 246, 247, 255, 271/256, 258, 264, 265, 273, 122, 272, 274, 188, 166

[56] References Cited

U.S. PATENT DOCUMENTS 2,716,548  8/1955  Fors ..................................... 271/242

FOREIGN PATENT DOCUMENTS 0072981  3/1983  European Pat. Off. .............. 271/10
0022230  2/1983  Japan .................................... 271/273

OTHER PUBLICATIONS

V. J. Falcone, "Document Separator", IBM Disclosure Bulletin, vol. 4, No. 4, Sep. 1961, p. 1.
D. K. Gibson, "Separator/Restraint Paper Feeder", IBM Disclosure Bulletin, vol. 18, No. 10, Mar. 1976, p. 3151.

Primary Examiner—Bruce H. Stoner, Jr.
Assistant Examiner—Lawrence J. Goffney, Jr.
Attorney, Agent, or Firm—Wenderoth, Lind & Ponack

[57] ABSTRACT

A paper feeding device includes conveyor rollers including top rollers and bottom rollers which rotate in the same direction and disposed respectively on two shafts in alternate positions. Timing rollers are provided on the down stream side of the conveyor rollers. The center-to-center distance between the two shafts is somewhat smaller than the sum of the radii of the top and bottom rollers. A recess is provided on each of the top rollers, so that the recess faces the direction of the circumference of the bottom rollers, when the forward end of the original sheet conveyed to the timing rollers by conveyor rollers abuts the timing rollers.

5 Claims, 10 Drawing Figures

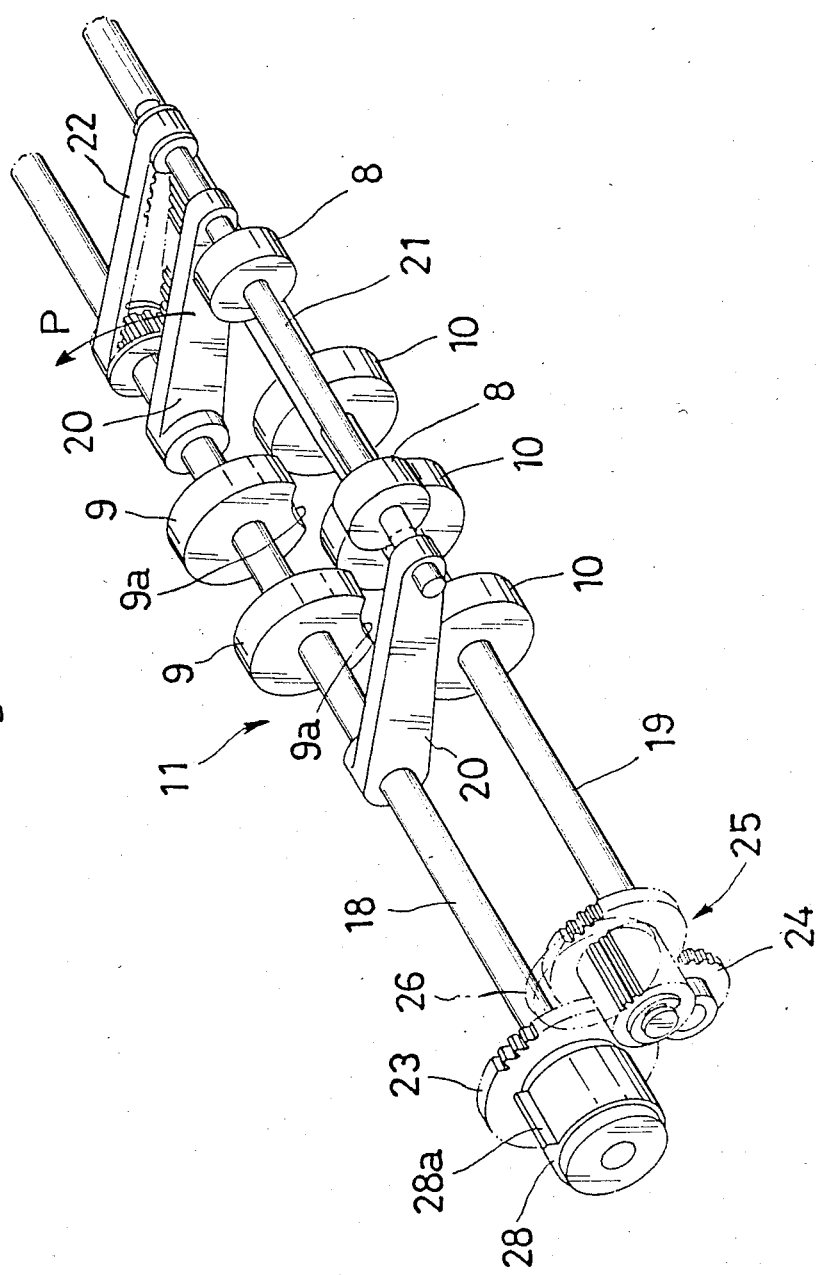

PAPER FEEDING DEVICE

BACKGROUND OF THE INVENTION

1. Field of the Invention

The present invention relates to a paper feeding device.

2. Description of the Prior Art

Some copying machines such as electrostatic photographic copying machines employ the so-called ADF (Automatic Document Feeder) which automatically feeds original sheets to an original receiving table. However, in such machines, two or more original sheets occasionally are fed at the same time, or the sheets are damaged while being fed, thereby reducing copying efficiency.

SUMMARY OF THE INVENTION

The present invention has been proposed to solve the above problems. According to the present invention, incorrect operations such as feeding of a number of original sheets at a time and damage to the sheets are surely prevented by providing a structure comprising: conveyor rollers including top rollers and bottom rollers which rotate in the same direction and are disposed respectively on to shafts in alternate lateral positions timing rollers provided downstream of the conveyor roller, wherein a center-to-center distance between the two shafts is somewhat less than the sum of the radii of the top and bottom rollers, a recess is provided on each of the top rollers so that the recess faces the circumference of the bottom rollers when the forward end of the original sheet conveyed to the side of the timing rollers by the conveyor rollers abuts the timing rollers.

BRIEF DESCRIPTION OF THE DRAWINGS

An embodiment of the present invention is shown in the accompanying drawings wherein:

FIG. 3 is a perspective view of main parts of feed rollers and of conveyor rollers;

DESCRIPTION OF THE PREFERRED EMBODIMENT

Figure 1:
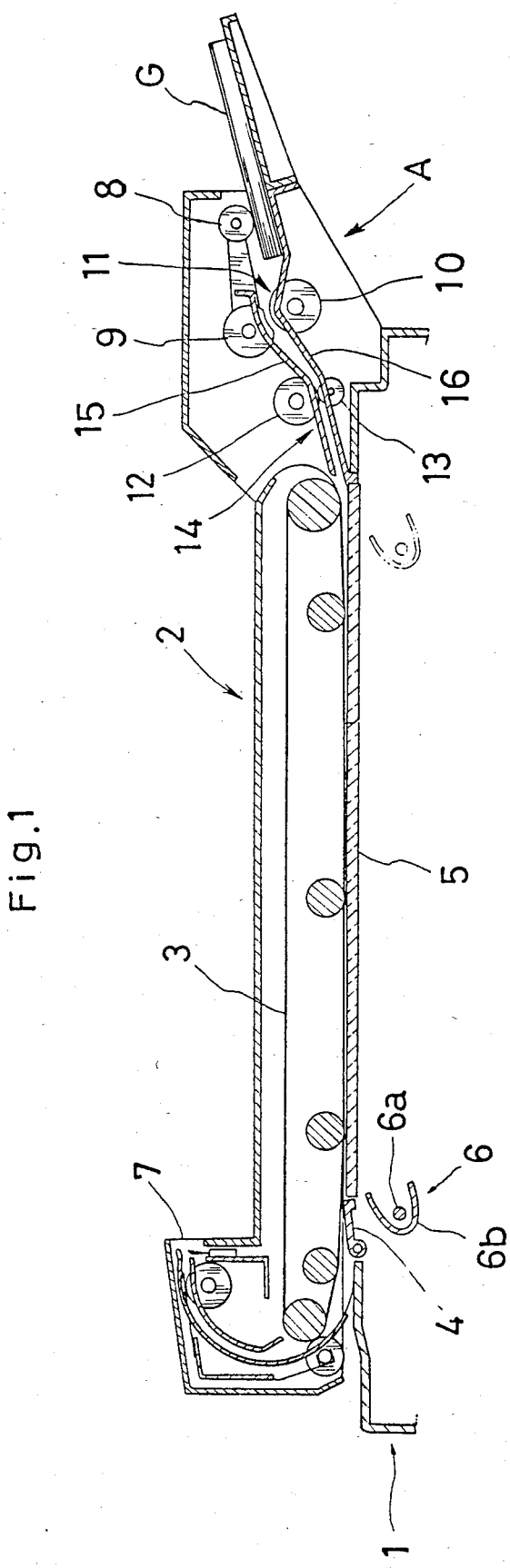
FIG. 1 is a side view of a main part of an automatic original feeding device incorporating the present invention.

FIG. 1 shows a main part of a transferable optical system of an electrostatic photographic copying machine with which the automatic original feeding device of the invention is employed.

An original receiving table 2 is provided on the top of the copying machine, an original G fed into the original receiving table 2 by a paper feeding device A is further conveyed by a conveyor belt 3, the foremost end of the original is caught by a stopper 4, and, when the original is stopped and held at a fixed position on a contact glass 5, an optical system 6 (a lamp 6a and a reflector mirror 6b only are shown in the drawing) driven by driving means (not shown) is moved in a direction parallel with the contact glass from a left side position, shown in FIG. 1 by solid lines, to a right side position, shown by dashed lines, for casting light on the original G. Upon completion of exposure of the original to light, the original G is released from the stopper 4, and again is conveyed toward an original take-out opening 7 by the conveyor belt 3 when a subsequent original is fed to the original receiving table 2 in a like manner.

Figure 2:
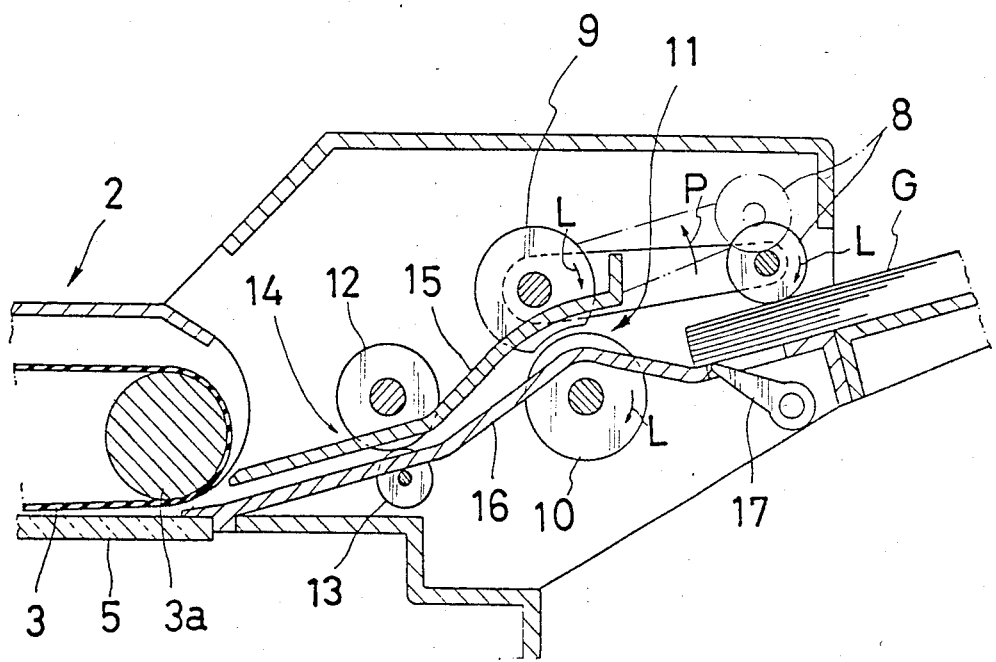
FIG. 2 is a schematic sectional side view of a paper feeding device.

The paper feeding device A, as shown in FIG. 2, is disposed on the upstream side of the original receiving table 2 and comprises feed rollers 8, conveyor rollers 11 disposed on the downstream side of the feed rollers 8 and including top rollers 9 and bottom rollers 10, and timing rollers 14 disposed on the downstream side of the conveyor rollers 11 and including a driving roller 12 and a follower roller 13. These rollers are arranged to operate while subjected to timing adjustment closely related to the conveyor belt 3, stopper 4, and optical system 6. The details of operation will be described later.

Reference numerals 15, 16, and 17 indicate an upper guide, a lower guide, which are provided in the path for conveying the original, and a sensor for detecting the original G, respectively.

Figure 4:
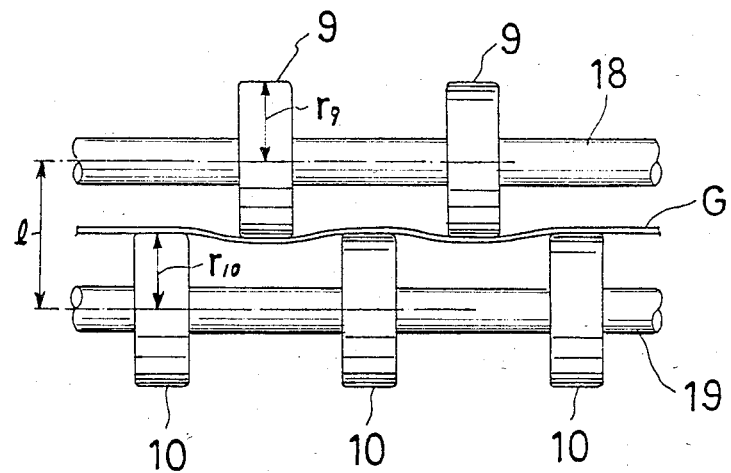
FIGS. 4 and 5 are partial views illustrating a positional relationship between two shafts for conveyor rollers.
Figure 5:
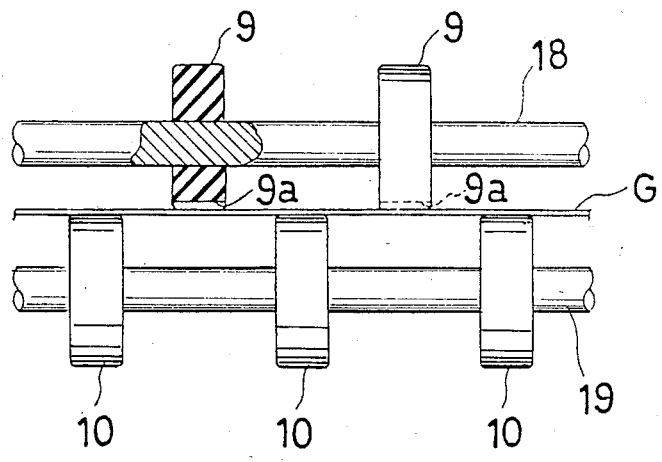

FIG. 3 shows an arrangement of feed rollers 8 and conveyor rollers 11, in which the top rollers 9 and the bottom rollers 10 composing the conveyor rollers 11 are made of rubber and individually fitted onto two shafts 18 and 19 to rotate in the same direction. As shown in FIG. 4, the top rollers 9 and the bottom rollers 10 are arranged to the positionally laterally alternate (in a zigzag pattern), and the center-to-center distance $l$ between the two shafts 18 and 19 is fixed as $l < r_9 + r_{10}$, where radii of the top roller and the bottom roller are $r_9$ and $r_{10}$, respectively, and also are $r_9 + r_{10} - l \approx 0.3 \sim 0.8$ mm, though the latter formula differs according to the intervals at which the top roller 9 and the bottom roller 10 are positioned on the shafts. Therefore, the original G passing between the top rollers 9 and the bottom rollers 10 is usually somewhat curved like a wave as shown in FIG. 4 and conveyed in the downstream direction while undergoing a force generated due to a difference in rotational speed or in the type of materials of the top rollers 9 and the bottom rollers 10. On the circumference of each top roller 9 is provided a recess 9a so that the original G is rarely subjected to the action of force exerted by the top roller 9 and the bottom roller 10 when the recess 9a of the top roller 9 is in a position to face the direction of the circumference of the bottom roller 10, as shown in FIG. 5.

The feed rollers 8 are fitted on a shaft 21 which is connected pivotally to arms 20 which are fitted rotatably on the shaft 18. The feed rollers 8 are rotated through transmission means 22, such as a chain or belt, simultaneously with the top rollers 9 and in the same direction.

When an original sheet G is conveyed in the downstream direction by the feed rollers 8, a subsequent original sheet must be fed after a lapse of a certain time, which is performed usually in the manner.

There are two optional methods for inactivating the feed rollers 8, namely, providing a one-direction clutch for the feed rollers 8 and moving the arms 20 upward (in the direction of arrow P in FIG. 2), when the foremost end of the fed original G reaches the downstream point slightly distant from the conveyor roller 11 and, after a lapse of a certain time, returning the arms 20 to the initial position thereof.

The shafts 18 and 19 are individually provided with gears 23 and 24 at first ends thereof, with which meshes a transmission gear 25 which further meshes with a driving gear 26 driven by a motor (not shown).

Figure 6:
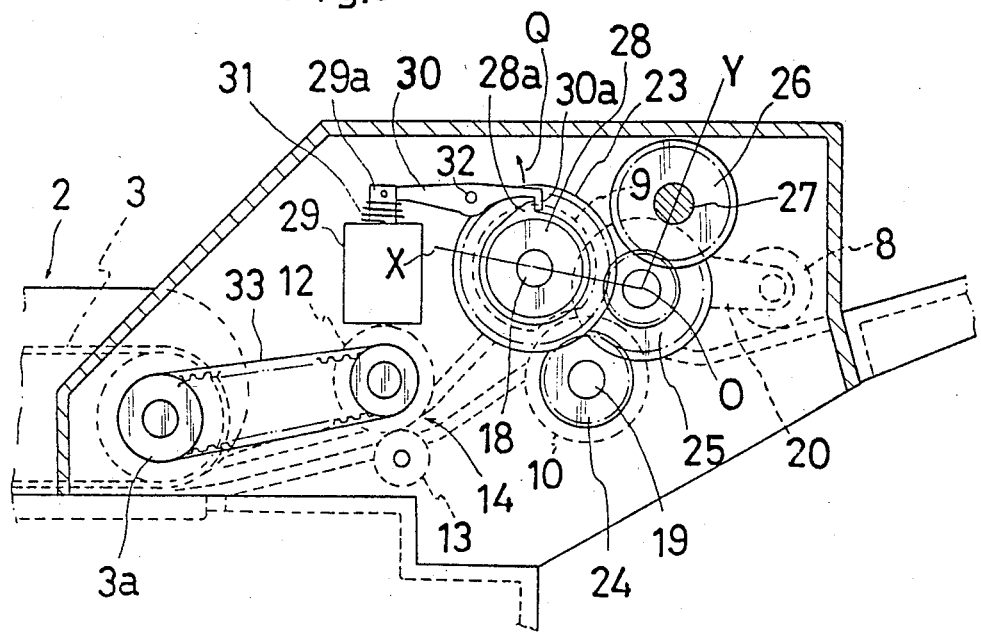
FIG. 6 is a side view of a transmission mechanism.
Figure 7:
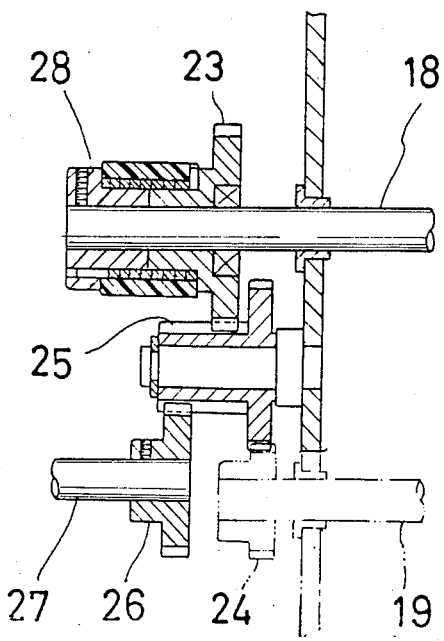
FIG. 7 is a sectional view taken along the line X-O-Y in FIG. 6.
Figure 8:
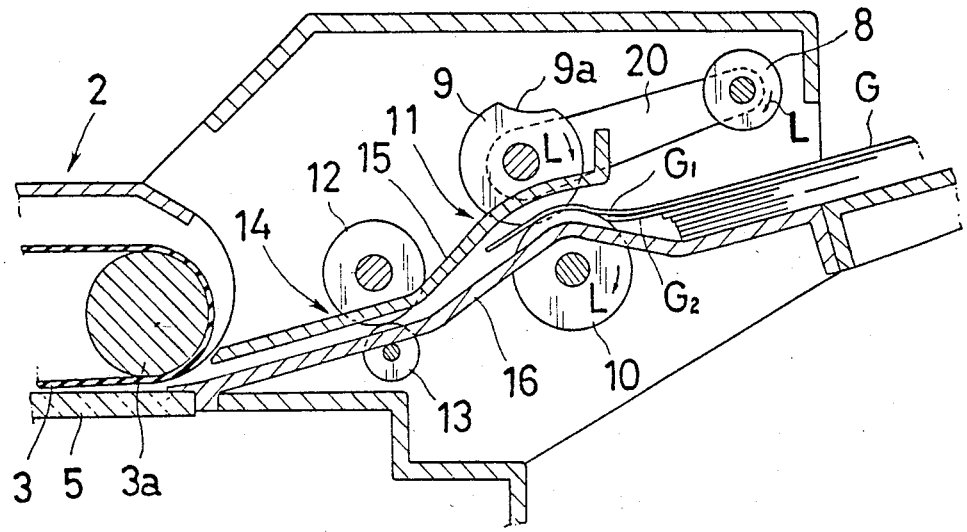
FIGS. 8 and 9 are side views illustrating operation of the device.

FIG. 6 and FIG. 7 show a part of a power transmission mechanism and, in particular, FIG. 7 is a sectional view taken along the line X-O-Y in FIG. 6.

Reference numerals 27, 28, and 28a indicate a driving shaft for transmitting rotation of the motor (not shown), a feed clutch fixed to the shaft 18, and a detent of clutch 28. The numeral 30 indicates a catching piece or pawl connected to a movable core 29a of a solenoid 29 and, when the solenoid is excited, which turns in the direction Q around a fulcrum 32 in opposition to the force of a spring 31, a catching end 30a of pawl 30 engaging with the clutch detent 28a. When one detent 28a is provided, the feed clutch 28 is actuated every revolution of the shaft 18.

The driving roller 12 of the timing rollers 14 is connected to a driving roller 3a that drives the conveyor belt 3 in the original receiving table 2, through a transmission mechanism 33 such as a chain or belt and a clutch (not shown).

With reference to FIGS. 2, 3, 8, and 9, operation of the paper feeding device will be described.

First, a predetermined number of originals G is set. Then an ON switch is actuated, the driving gear 26 is driven by the motor and gear 24, and the bottom rollers 10 are rotated by the gear 25 in the direction L. Gear 23 also is rotated, but the solenoid is not yet excited, the catching end 30a of the catching piece 30 engages with the clutch detent 28a of the feed clutch 28 to prevent rotation of the shaft 18 and the top rollers 9, whereby the recesses 9a in the top rollers 9 face the circumference of the bottom rollers 10. Upon operation of a paper feed switch, the feed rollers 8 are moved from the position shown by the imaginary lines in FIG. 2 to the position indicated by the continuous lines, that is, a position at which the feed rollers 8 come into contact with the original G due to gravity, by a cam (not shown), and the solenoid 29 is excited, whereby engagement of the catching end 30a of the catching piece 30 with the clutch detent 28a is released, driving power of the gear 23 is transmitted to the shaft 18, and, accordingly, the top rollers 9 and the feed rollers 8 are turned in the direction L. At this time, the driving roller 3a contained in the original receiving table 2 is at a standstill and thus the conveyor belt 3 as well as the timing rollers 14 are also at a standstill.

The first original sheet $G_1$ is conveyed by the rotation of the feed rollers 8 in the downstream direction. At this time, the second sheet $G_2$ occasionally moves together with the first sheet but is stopped when the foremost end thereof abuts on the bottom rollers 10 which rotate in the direction L.

After the first original $G_1$ is clamped between the circumference of the top rollers 9 and of the bottom rollers 10, the feed rollers 8 again are moved to the position spaced from the original G by the cam, as shown by the imaginary lines in FIG. 2.

Figure 9:
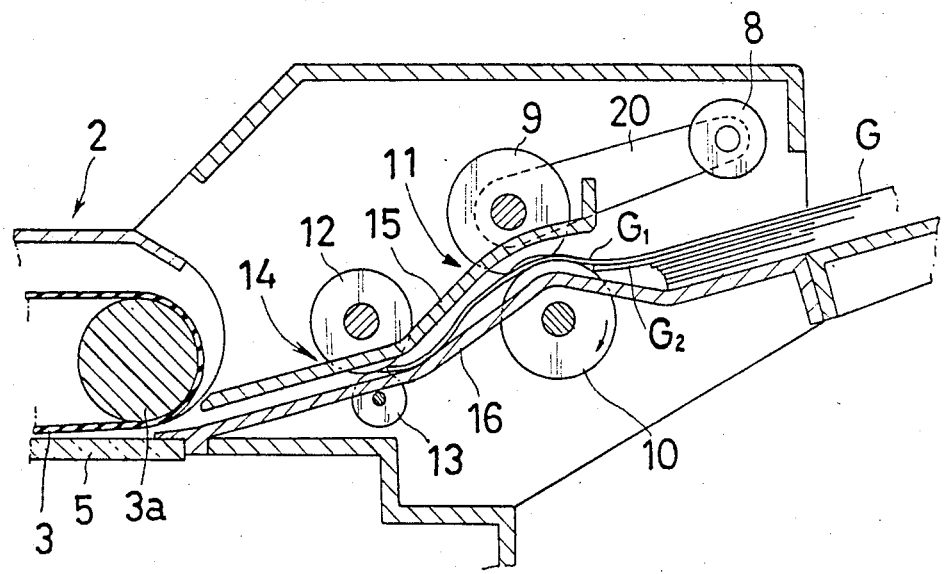

The first original sheet $G_1$ clamped between the circumferences of the top rollers 9 and the bottom rollers 10 is conveyed further in the downstream direction and, as shown in FIG. 9, just when or after the foremost end of the original G1 abuts on the timing rollers 14, the clutch detent 28a of the feed clutch 28 that has been revolving together with the top rollers 9 again engages with the catching end 30a of the catching piece 30, moved to the engaging position due to de-excitation of the solenoid 29, to stop rotation of the shaft 18 and the gear 23.

Thus, rotation of the top rollers 9 and the feed rollers 8 stops, with the recesses 9a of the top rollers 9 in positions facing the circumference of the bottom roller 10. Therefore, the clamping force of the conveyor rollers 11 is not exerted on the original $G_1$.

When the top rollers 9 are stopped, with the foremost end of the original $G_1$ abutting the timing rollers 14, the foremost end of the original $G_1$ is positionally adjusted to be straight even through touching the timing rollers 14 while skewing.

On the other hand, when the foremost end of the original $G_1$ abuts the timing rollers 14 or is in a position close thereto, the position of the original is detected by a position sensor (not shown) and, in response to a signal emitted from the sensor, the driving roller 3a in the original receiving table 2 is driven by the driving source (not shown), whereby the timing rollers 14 and the conveyor belt 3 are actuated.

The foremost end of the original $G_1$ is conveyed in the downstream direction while being clamped by the timing rollers 14. However, since the feed rollers 8 are out of contact with the original as described above and none of the clamping force of the conveyor rollers 11 is exerted on the original $G_1$, the original is not impaired and is surely conveyed, even through the conveying force of the conveyor belt 3 and timing rollers 14 is weak.

Figure 10:
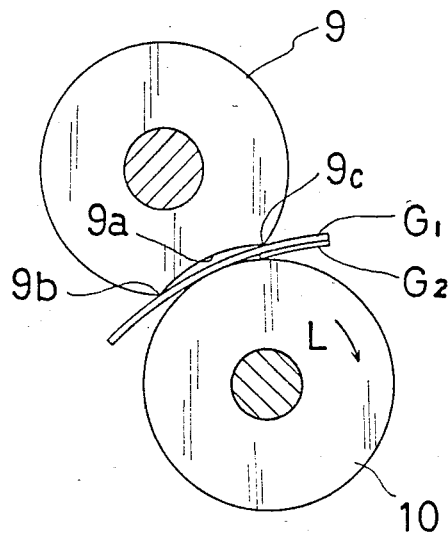
FIG. 10 is a side view illustrating the action of conveyor rollers.

Further, with reference to FIG. 10, the original $G_1$ is slightly pressed to the periphery of the bottom rollers by the weight of the original and by corners or border parts 9b and 9c between the top roller circumference and the recess 9a. Therefore, the second original $G_2$ is stopped, even if conveyed together with the first original $G_1$, by the rotation of the bottom rollers 10 in the direction L so as to be advanced no further.

When the original $G_1$ entering the original receiving table 2 is stopped at a fixed position on the contact glass 5 after being subjected to control by the stopper 4 at the foremost end thereof and the stop of the conveyor belt 3, the optical system 6 casts light on the original $G_1$ and, upon completion of exposure of the original to light, the stopper 4 releases the foremost end of the original from control.

With the release of control effected by the stopper 4, the original $G_1$ is conveyed to the original take-out opening 7 by the conveyor belt 3 and, on the other hand, the feed rollers 8 abut on next original $G_2$ in response to a feed starting signal, the top rollers 9 and the feed rollers 8 start rotating for causing the second original $G_2$ to abut the timing rollers 14 that have been stopped by the above clutch (not shown), and the conveyor belt 3 and the timing rollers 14 are rotated to feed the second original into the original receiving table 2.

As has been described in detail, since the present invention provides a structure comprising: conveyor rollers including top rollers and bottom rollers which rotate in the same direction, and disposed on two shafts individually so as to be alternately positioned; and timing rollers provided on the downstream side of the conveyor rollers, wherein the center-to-center distance between the two shafts is adapted to be somewhat smaller than the sum of the radii of the top and the bottom rollers, a recess is provided on each of the top rollers so that the recesses faces the circumferences of the bottom rollers when the forward end of the original sheet conveyed to the timing rollers by the conveyor rollers abuts the timing rollers, incorrect operations such as feeding a number of original sheets at a time and impairment of the original sheet or the like are surely prevented.

It is a matter of course that the application of the present invention is a feeding device for feeding sheets of copying paper to a copying machine enables similar effects to those described above.

We claim:

1. A paper feeding device for feeding sheets in a feed direction, said device comprising:

upper and lower parallel shafts having respective axes;

conveyor rollers for conveying sheets in the feed direction, said conveyor rollers comprising top rollers mounted on said upper shaft and bottom rollers mounted on said lower shaft, said top and bottom roller rotating in the same direction and being arranged on the respective said shafts to alternate with each other in a direction along the lengths of said shafts, said axes of said shafts being spaced by a distance which is less than the sum of the radii of an adjacent pair of said top and bottom rollers;

timing rollers mounted downstream of said conveyor rollers, with respect to the feed direction; and each said top roller having a recess formed in the circumference thereof at a position such that, when a leading end of a sheet conveyed by said conveying rollers abuts said timing rollers, said recesses in said top rollers face in directions toward circumferences of said bottom rollers.

2. A device as claimed in claim 1, wherein, when said recesses face in said directions, the sheet is slightly pressed toward said bottom rollers by the weight of the sheet and by corners formed by the juncture of each said recess with the circumference of the respective top roller.

3. A device as claimed in claim 2, wherein, when said recesses face in said directions, said top rollers stop rotation, and said bottom rollers rotate in a direction to urge the sheet upstream with respect to the feed direction.

4. A device as claimed in claim 1, employed as means for feeding original documents to be copied to a copying machine.

5. A device as claimed in claim 1, employed as means for feeding copying paper sheets to a copying machine.

* * * * *